Aug. 9, 1960     J. LIMIDO ET AL     2,948,667
PROCESS FOR THE PHOTOCHEMICAL CHLORINATION
OF CYCLOHEXANE IN THE LIQUID PHASE
Filed June 10, 1957                     2 Sheets-Sheet 1

INVENTORS
JEAN LIMIDO &
FRANCIS DE PAUW
BY Wenderoth, Lind & Ponack
ATTORNEYS

United States Patent Office
2,948,667
Patented Aug. 9, 1960

2,948,667

PROCESS FOR THE PHOTOCHEMICAL CHLORINATION OF CYCLOHEXANE IN THE LIQUID PHASE

Jean Limido, Paris, France, and Francis De Pauw, Tertre, Belgium, assignors to Institut Français du Petrole des Carburants et Lubrifiants, Paris, France Filed June 10, 1957, Ser. No. 664,756

3 Claims. (Cl. 204—163)

The present invention relates to a process for the continuous halogenation of cyclohexane under the action of light as activating agent. More particularly, it relates to the preparation of monochlorocyclohexane by the direct chlorination of cyclohexane.

The direct chlorination of cyclohexane into chlorocyclohexane constitutes the most economical method for the manufacture of this product. It has already been proposed, e.g. by Britton and Perkins in U.S. Patent No. 2,287,665. This patent discloses a cyclic process in which chlorine (or bromine) is introduced into a reactor which has been previously charged with cyclohexane and from which the reaction mixture is continuously withdrawn, unreacted cyclohexane being separated and recycled. In order to enhance the reaction, these patentees propose the use either of light of a wave length comprised between 5200 and 5400 A. or of catalysts, particularly phosphorus trichloride.

A primary object of the present invention is to improve prior procedure in the said chemical reaction. This object is realized, briefly stated, by mixing the chlorine and cyclohexane, preferably in the dark, prior to the reaction, and then carrying out the latter—photochemical chlorination of the cyclohexane (or for that matter of paraffin hydrocarbon)—by exposing the reaction mixture to light of a wave length comprised between 2500 and 4500 A. With this wave length, the reaction proceeds much more rapidly for a given quantity of light energy. Under these conditions, a better utilization of the light is realized because, in this range of wave lengths, the coefficient of absorption of light by chlorine dissolved in organic solvents is of increased magnitude.

It frequently happens, however, when a mixture of such hydrocarbons and chlorine is irradiated, the chlorine reacts slowly at first if at all, and then after a period of variable duration, as a function of the light power employed the reaction becomes extremely vigorous if subjected to a sufficient quantity of light energy.

The said induction period is due to small amounts of oxygen and other impurities which are always present in dissolved state in the hydrocarbons.

In order to overcome the inhibiting action of these traces of oxygen or other impurities which may be present in the cyclohexane, it is advantageous to employ a supplemental quantity of light energy over the quantity of light energy theoretically necessary, calculated on the basis of theoretical yields. Under these conditions, the reaction is extremely rapid. This supplemental quantity of light energy is dependent on the proportion of oxygen and other impurities present in the cyclohexane used. According to the invention, with commercial cyclohexane, the supplemental quantity of light energy which permits the best yields is at least equal to the quantity of light energy theoretically necessary for irradiating the first reaction tube of a multistage apparatus. Consequently, the supplemental quantity of light energy as compared to the total quantity of light energy theoretically necessary corresponds at least to:

50% in the case of a two-stage apparatus,
33% in the case of a three-stage apparatus,
25% in the case of a four-stage apparatus,
20% in the case of a five-stage apparatus, etc.

Moreover, in order to obtain high yields of monochlorinated derivative, it is necessary to limit the rate of conversion of the cyclohexane. At high conversion rates, the monochlorinated derivative formed in the first stages of the reaction, in turn reacts with the chlorine to produce more highly chlorinated derivaties. In order to obtain high yields of monochlorinated product, it is preferable to regulate the quantities of chlorine and of cyclohexane involved in the reaction so that the molar ratio chlorine: cyclohexane is relatively low.

According to the present invention, optimum yield of monochlorocyclohexane in a continuous process is advantageously realized by employing a reactor constituted by horizontal transparent tubes, in each of which tubes a partial conversion takes place. The chlorine-cyclohexane mixture is introduced at one end of one of these tubes, while at the other end there is withdrawn a mixture of chlorinated product and cyclohexane.

The accompanying drawings illustrate certain of the various forms of apparatus which may be employed in practicing the invention.

Figure 1:
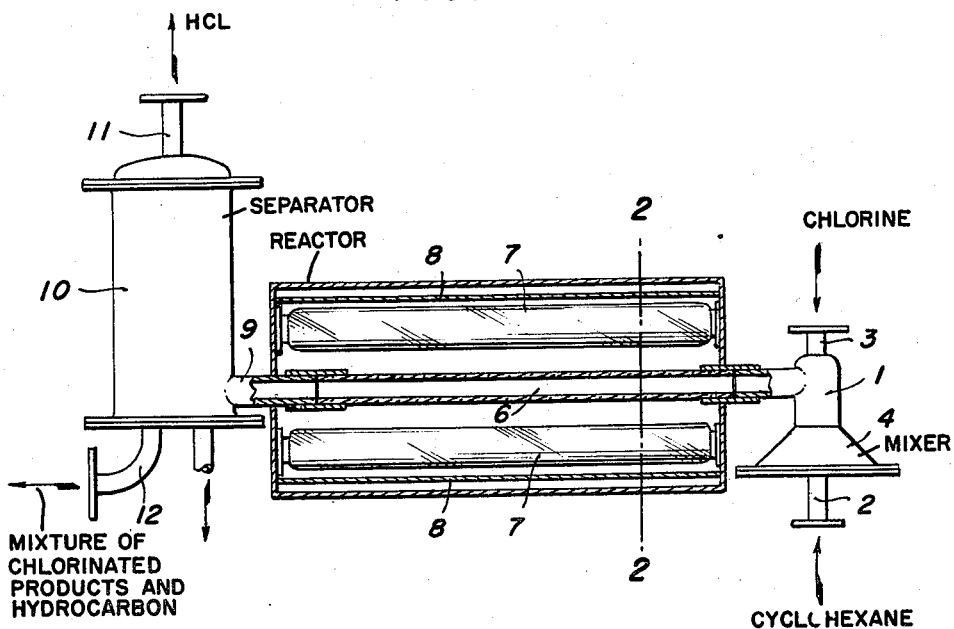
Fig. 1 is a view partly in section and partly in elevation of a reactor according to the invention.
Figure 2:
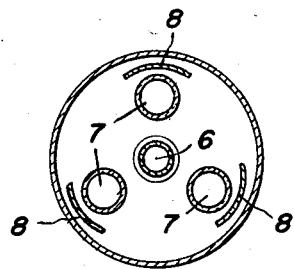
Fig. 2 is a view taken along line 2—2 of Fig. 1.
Figure 3:
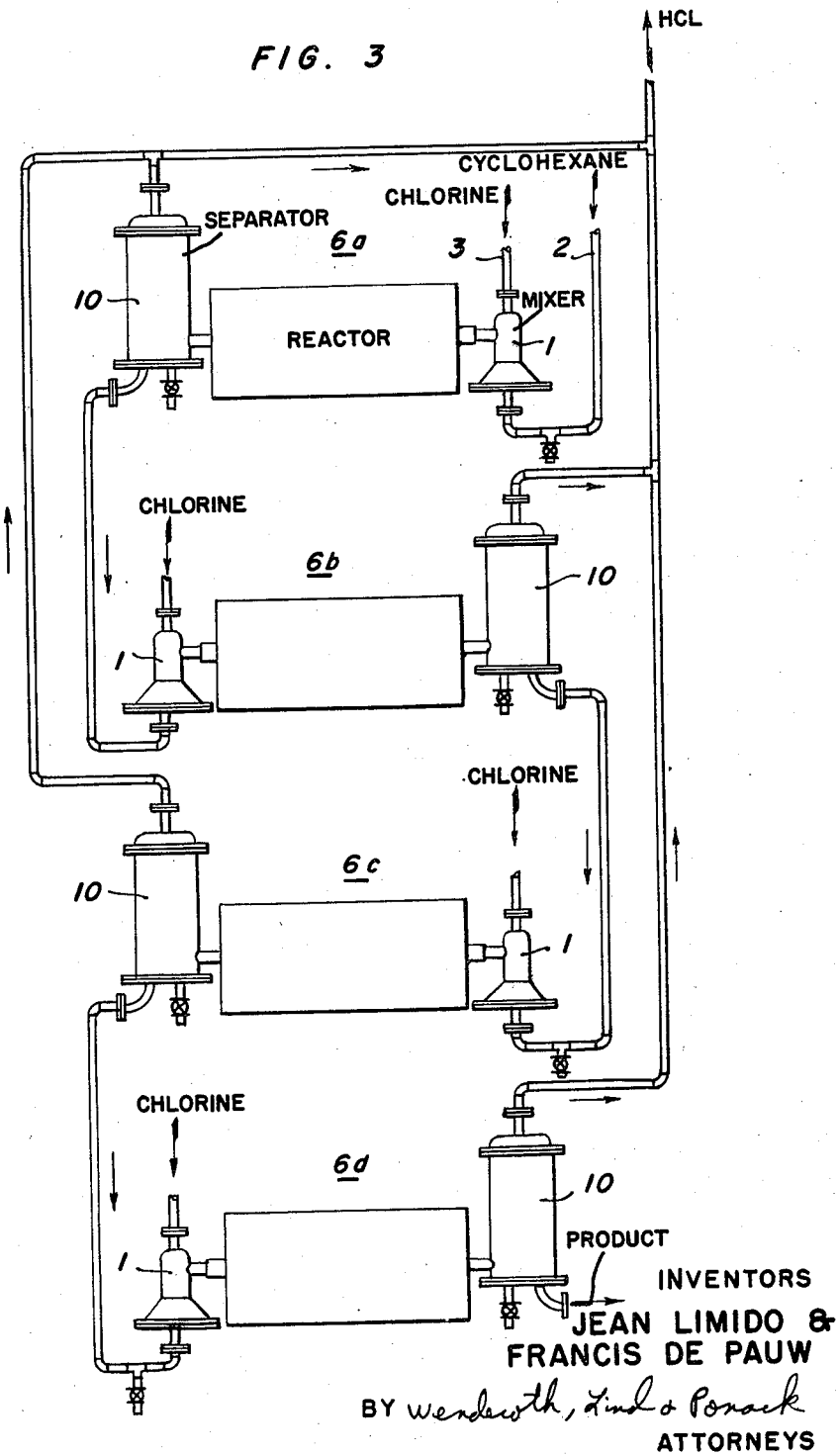
Fig. 3 is a diagrammatic representation of a multiple stage reactor system for carrying out the process of the invention.

Referring first to Figs. 1 and 2, the hydrocarbon to be chlorinated, e.g. cyclohexane, is introduced into the mixer 1 through the inlet 2 of the mixer, while simultaneously the chlorine is introduced through the inlet 3. The cyclohexane and chlorine are admixed in the mixer 1 in the dark, whereby the chlorine is dissolved in the cyclohexane, and the resultant solution is then introduced into the transparent reaction tube 6.

In its passage through the reaction tube 6, the liquid phase mixture (solution) is illuminated by means of a number of fluorescent tubes 7 (three being used for example in the illustrated embodiment) which are mounted in per se conventional manner interiorly of associated part-cylinder reflectors 8; see Fig. 2.

The reaction product obtained at the outlet 9 of the reaction tube is then introduced into the cooling chamber 10 where the reaction mixture is cooled and gaseous HCl is discharged via the outlet 11 at the upper part of the chamber 10. From the outlet 12 at the lower part of the chamber is withdrawn a mixture of chlorinated products and cyclohexane.

The reaction being carried out in several stages, e.g. four stages (as in the case of Fig. 2), the products withdrawn at the outlet of the first tube 6a are first freed of liberated hydrochloric acid, cooled, and are then admixed in a second stage with a further quantity of chlorine (in the dark), the mixture being then introduced into one end of a second tube 6b. The products withdrawn from the other end of this second tube are freed from hydrocloric acid, cooled, admixed with a further quantity of chlorine, and this new mixture is then introduced into one end of a third tube 6c. The products withdrawn from the other end of the third tube are freed from hydrochloric acid, cooled, admixed with a further quantity of chlorine in the dark, and the mixture is then introduced into one end of a fourth tube 6d, from the other end of which there is withdrawn the final mixture of products, from which the desired monochlorocyclohexane is then separated.

Such a parallel current reactor which makes it possible to maintain the concentration gradient resulting from the evolution of the reaction, is superior to a conventional reactor of constant regime and uniform concentration. In addition, the discharge of monochlorocyclohexane by the introduction of cyclohexane can be effected under optimum conditions by the employment, in a continuous process, of horizontal transparent tubular reactors, at one end of which there is fed a solution of chlorine in cyclohexane at a sufficient rate to produce a high linear speed, and at the other end of which the formed products are withdrawn.

The monochlorocyclohexane concentration thus increases proportionately with the carrying out of the reaction, starting from an initial value of zero and increasing up to the final value. The concentration of monochlorocyclohexane during the reaction is thus always less than the final concentration, whereby it is possible to limit the formation of polychlorinated derivatives.

Moreover, in order to avoid high local concentrations of monochlorocyclohexane which would lead to an appreciable increase in the proportion of polychlorinated derivatives, it is advantageous that the initial chlorine-cyclohexane mixture be made sufficiently homogeneous (which result is to be obtained for example by the dissolution of the chlorine in the cyclohexane in the dark) before introducing the said mixture into the reaction zone.

Finally, in order to overcome the inhibiting action of the traces of oxygen or other impurities which may be contained in the cyclohexane, it is sufficient to increase the intensity of the irradiation at the first transparent tube of the first reaction in the case of a multi-stage apparatus.

An important condition for the good conduct of the conversion consists in avoiding as far as possible the presence of chlorine and of cyclohexane in the vapor phase above the reaction medium. In fact, the mixture of chlorine and of cyclohexane in the vapor phase leads to a violent, and often explosive, reaction and, in any case, gives rise to particles of carbon which prevent the transmission of light rays, thus making it necessary to interrupt the operation of the apparatus.

One of the possible causes of the passage of chlorine and of cyclohexane into the vapor phase is the entrainment of these by the hydrochloric acid formed in the reaction. It is therefore necessary that the hydrochloric acid be eliminated at the end of the reactor opposite that at which the chlorine is introduced (outlet 11 of Fig. 1).

In order to avoid the formation of a substantial vapor phase and the return back of monochlorocyclohexane, with consequent poor yields of the latter, the employment of vertical reactors and inclined reactor with thin film flow is excluded, according to this invention.

While a vertical reactor with a parallel current feed at the lower end has the advantage of permitting the ready elimination of hydrochloric acid without withdrawing the chlorine from the reaction medium, it entails the disadvantage—due to the higher density of the monochlorocyclohexane—of maintaining high concentrations of the latter in the vicinity of the chlorine feed, which increases the proportion of polychlorinated product.

If the vertical reactor were fed at the top thereof, the result would be a considerable entrainment of chlorine in the surmounting vapor phase, which is precisely what it is desired to avoid.

The employment of a thin film flow in an inclined tube system also presents the disadvantage of maintaining a substantial vapor phase containing, in addition to the readily eliminable formed hydrochloric acid, chlorine and cyclohexane entrained by the hydrochloric acid. In such case, the danger of explosive reaction in the vapor phase is still greater.

In contrast, a horizontal tubular reactor, which is fed through a suitable feed control device, makes possible the progressive removal of the monochlorocyclohexane in proportion to its formation. Moreover, any vapor phase above the reaction mixture is reduced to a minimum, and the danger of explosion is eliminated as a result of the overpressure of the hydrochloric acid which dilutes the chlorine.

An important factor which favors the passage of chlorine and cyclohexane into the vapor phase is elevation in temperature resulting from the considerable evolved heat of reaction (24 Kcal./mole). It is therefore advisable to limit the reaction temperature, which is done by employing a reactor with several stages.

The cooling of the products leaving each stage before their introduction into the following stages makes it possible to operate with total safety regardless of the conversion rate, by eliminating all risk of violent reaction in the vapor phase.

The process for the chlorination of cyclohexane according to the present invention affords yields which are higher than those obtainable by prior continuous chlorination processes with uniform concentration of monochlorocyclohexane, such for example as the aforementioned process employed by E. C. Britton and R. P. Perkins.

Thus, for the same rate of conversion, the yield of monochlorinated product relative to the cyclohexane converted is higher (and consequently for a same conversion in monochlorocyclohexane less of di- and polychlorocyclohexane are obtained), when the process of the present invention is employed, as is shown by the following table:

TABLE 1

| Cyclohexane converted in percent of initial cyclohexane | Yield of monochlorocyclohexane in percent of initial cyclohexane | | Yield of di and polychlorocyclohexane in percent of initial cyclohexane | | Yield of monochlorocyclohexane in percent of cyclohexane converted | |
|---|---|---|---|---|---|---|
| | Process of chlorination— | | | | | |
| | According to this invention | With uniform monochlorocyclohexane concentration | According to this invention | With uniform monochlorocyclohexane concentration | According to this invention | With uniform monochlorocyclohexane concentration |
| 5 | 4.93 | 4.86 | 0.07 | 0.14 | 98.5 | 97.2 |
| 10 | 9.7 | 9.4 | 0.3 | 0.6 | 97.0 | 94.2 |
| 15 | 14.3 | 13.6 | 0.7 | 1.3 | 95.5 | 91.0 |
| 20 | 18.8 | 17.6 | 1.2 | 2.4 | 93.9 | 87.8 |
| 30 | 27.1 | 24.2 | 2.9 | 5.8 | 90.2 | 80.8 |
| 40 | 34.4 | 29.2 | 5.6 | 10.8 | 86.0 | 73.0 |

According to the invention, a multi-stage apparatus is preferably employed, each stage of which comprises a transparent horizontal tube, 30 mm. in diameter and 60 cm. in length, provided with means for dissolving the chlorine in the cyclohexane in the absence of light before introduction thereof into the tube in which the chlorine-cyclohexane mixture circulates in the presence of light emitted by three fluorescent tubes having a total power of 60 watts for the first stage of a multi-stage apparatus and by one fluorescent tube having a power of 20 watts at each subsequent stage of a multi-stage apparatus. Fluorescent tubes of which the spectrum shows a maximum at about 3600 A. are preferably employed. The supplemental quantity of light energy for the first stage is used in order to overcome the inhibiting action of oxygen or other impurities which may be present in the cyclohexane. The quantity of chlorine introduced at each stage is limited by the presence of cyclohexane vapors, resulting from the reaction heat. In the conditions of the following examples and with a feeding rate of 140 moles per hour of cyclohexane, the maximum quantities of chlorine to introduce were respectively 8.6 moles per hour at the first stage and 17.7 moles per hour at the second and subsequent stages.

The following examples illustrate representative embodiments of the invention.

*Example 1*

This exemplifies the use of a two-stage apparatus as precedingly described. At the first stage, there are introduced in a continuous manner cyclohexane at a speed of 140 moles per hour and chlorine at a speed of 6.04 moles per hour. At the second stage, 12.08 moles per hour of chlorine are introduced. After elimination of the HCl formed at the outlet of each stage, there are obtained at the outlet of the second reaction tube 16.88 moles per hour of monochlorocyclohexane and 0.62 mole per hour of products with a higher chlorine content (principally dichlorocyclohexane) which corresponds to a conversion rate of 12.5% of initial cyclohexane and a 96.44% yield of monochlorocyclohexane relative to the cyclohexane converted.

*Example 2*

This exemplifies the use of a three-stage apparatus as precedingly described. Into the reactor cyclohexane is introduced in a continuous manner, at a speed of 140 moles per hour and chlorine is introduced at the first stage at a speed of 8.22 moles per hour, and at the second and third stages at a speed of 16.45 moles per hour. After elimination of the HCl formed at the outlet of each reaction tube, there is obtained at the outlet of the third reaction tube 34.5 moles per hour of monochlorocyclohexane and 3.3 moles per hour of di- and polychlorocyclohexane, which corresponds to a conversion rate of 27% of initial cyclohexane and a 91.26% yield of monochlorocyclohexane relative to the cyclohexane converted.

*Example 3*

This exemplifies the use of a four-stage apparatus as precedingly described and shown in Fig. 2. Into the reactor cyclohexane is introduced in a continuous manner at a speed of 140 moles per hour and chlorine is introduced at the first stage at a speed of 7.58 moles per hour and at the three subsequent stages at a speed of 14.15 moles per hour. After elimination of the formed HCl at the outlet of each reaction tube, there is obtained at the outlet of the fourth reaction tube 42.16 moles per hour of monochlorocyclohexane, and 5.44 moles per hour of di- and polychlorocyclohexane, which corresponds to a conversion rate of 34% of initial cyclohexane and a 88.57% yield of monochlorocyclohexane relative to the cyclohexane converted.

*Example 4*

This exemplifies the use of a five-stage apparatus as precedingly described. Into the reactor cyclohexane is introduced in a continuous manner at a speed of 140 moles per hour and chlorine is introduced at the first stage at a speed of 7.19 moles per hour and at the four subsequent stages at a speed of 14.38 moles per hour. After elimination of the formed HCl at the outlet of each reaction tube, there is obtained at the outlet of the fifth reaction tube 48.65 moles per hour of monochlorocyclohexane and 8.05 moles per hour of di- and polychlorocyclohexane, which corresponds to a conversion rate of 40.5% of initial cyclohexane and a 85.80% yield of monochlorocyclohexane relative to the cyclohexane converted.

Having thus disclosed the invention, what is claimed is:

1. A continuous process for the manufacture of monochlorocyclohexane in the liquid phase, which comprises homogeneously admixing cyclohexane with not more than about 0.06 mole of chlorine per mole of cyclohexane in absence of light, then subjecting the resultant solution which consists essentially of chlorine and cyclohexane, to the action of ultraviolet rays while moving the mixture successively through a plurality of interconnected elongated and horizontally disposed reaction zones, removing hydrochloric acid liberated at the end of each reaction zone from the reaction mixture and admixing the latter, after cooling, with not more than about 0.13 mole of chlorine per mole of initial cyclohexane in the absence of light as the mixture passes from said reaction zone to the next, withdrawing the reaction mixture from the last reaction zone and recovering monochlorocyclohexane therefrom.

2. A process according to claim 1, wherein the light rays have a wave length comprised in the range from 2500 to 4500 A.

3. A process according in claim 1, wherein maximum irradiation is effected in the first zone.

References Cited in the file of this patent

UNITED STATES PATENTS

| | | |
|---|---|---|
| 2,154,049 | Levine et al. | Apr. 11, 1939 |
| 2,287,665 | Britton et al. | June 23, 1942 |
| 2,370,342 | Zellner | Feb. 27, 1945 |
| 2,683,688 | Tramm et al. | July 13, 1954 |

OTHER REFERENCES

Ellis et al.: Chemical Action of Ultraviolet Rays, page 542.